US010173329B2

(12) United States Patent
Christiansen

(10) Patent No.: US 10,173,329 B2
(45) Date of Patent: Jan. 8, 2019

(54) METHOD AND ROBOT CELL FOR HANDLING STACKS OF FLEXIBLE SUBSTRATES

(71) Applicant: Yaskawa Nordic AB, Torsås (SE)

(72) Inventor: Henrik Christiansen, Torsås (SE)

(73) Assignee: YASKAWA NORDIC AB (SE)

( * ) Notice: Subject to any disclaimer, the term of this patent is extended or adjusted under 35 U.S.C. 154(b) by 0 days.

(21) Appl. No.: 15/129,708

(22) PCT Filed: Mar. 19, 2015

(86) PCT No.: PCT/SE2015/050320
§ 371 (c)(1),
(2) Date: Sep. 27, 2016

(87) PCT Pub. No.: WO2015/147725
PCT Pub. Date: Oct. 1, 2015

(65) Prior Publication Data
US 2017/0036356 A1    Feb. 9, 2017

(30) Foreign Application Priority Data
Mar. 28, 2014 (SE) ...................... 1450360

(51) Int. Cl.
*B25J 15/02* (2006.01)
*B25J 15/00* (2006.01)
(Continued)

(52) U.S. Cl.
CPC .............. *B25J 15/0253* (2013.01); *A21C 9/08* (2013.01); *B25J 15/0014* (2013.01);
(Continued)

(58) Field of Classification Search
CPC .. B25J 9/0087; B25J 15/0052; B25J 15/0206; B25J 15/024; B25J 15/0253;
(Continued)

(56) References Cited

U.S. PATENT DOCUMENTS 1,420,458 A * 6/1922 Steinmetz .............. B21D 43/24
271/103
1,444,776 A * 2/1923 Berry ....................... B65H 1/14
271/37

(Continued)

FOREIGN PATENT DOCUMENTS

DE      2753668 A  *  6/1979    ............. B65H 31/38
DE      2753668 A1 *  6/1979    ............... B65H 3/48
(Continued)

*Primary Examiner* — Saul Rodriguez
*Assistant Examiner* — Brendan P Tighe
(74) *Attorney, Agent, or Firm* — Condo Roccia Koptiw LLP

(57) ABSTRACT

The invention concerns a method of handling stacks of flexible substrates (14) by means of a gripper (8) as well as a robot cell (1) for carrying out the method. The gripper (8) is arranged on an arm (6) of a robot (2) and has a lower finger and a corresponding upper finger. The method comprises the steps of inserting said lower finger below a bottom substrate (14) of a stack resting on a base and said upper finger above a top substrate (14) of the stack, and gripping the stack by clamping it between said lower and upper finger. Then by means of the gripper (8) starting at a stack front the entire stack is lifted into a pendent state and moved to a support (16). There the stack is lowered such that a stack rear, which is opposite to said stack front, comes into contact with the support (16). Finally the entire stack is laid out on the support (16) with said bottom substrate (14) up by further lowering and while horizontally displacing the gripper (8) in a bottom-to-top substrate direction before letting the gripper (8) release the stack.

11 Claims, 3 Drawing Sheets

(51) Int. Cl.
*B65H 31/30* (2006.01)
*B65H 31/40* (2006.01)
*A21C 9/08* (2006.01)
*B65H 3/32* (2006.01)
*B65H 15/02* (2006.01)
*B25J 9/00* (2006.01)

(52) U.S. Cl.
CPC ............. *B65H 3/322* (2013.01); *B65H 15/02* (2013.01); *B65H 31/3045* (2013.01); *B65H 31/40* (2013.01); *B25J 9/0087* (2013.01); *B65H 2555/31* (2013.01); *B65H 2701/173* (2013.01)

(58) Field of Classification Search
CPC ..... B25J 15/0293; B25J 15/0014; B65H 3/50; B65H 3/322; B65H 5/006; B65H 9/12; B65H 29/02; B65H 29/06; B65H 29/08; B65H 31/38; B65H 2301/422; B65H 2301/4224; B65H 2301/42242; B65H 2301/422542; B65H 2301/42256; B65H 2301/4226; B65H 2301/42262; B65H 2201/44338; B65H 2301/4471; B65H 2405/57; B65H 2511/152; B65H 2555/31; B65H 2601/524; B65H 31/3045; B65H 2701/173; Y10S 901/31

USPC ................. 101/415.1; 414/222.1, 751.1, 806
See application file for complete search history.

(56) References Cited

U.S. PATENT DOCUMENTS

| | | | | |
|---|---|---|---|---|
| 2,003,698 | A | * | 6/1935 | Remington .............. B65H 3/02 271/25 |
| 2,362,853 | A | * | 11/1944 | Spiller .......................... 271/155 |
| 3,222,060 | A | * | 12/1965 | Waldemar .............. B65H 31/40 271/210 |
| 4,140,234 | A | * | 2/1979 | Steinhart ............ B65H 31/3018 108/20 |
| 9,351,569 | B1 | * | 5/2016 | Lucey .................... A47B 88/04 |
| 9,758,329 | B2 | * | 9/2017 | Fleckenstein .......... B25J 9/0087 |
| 2009/0082901 | A1 | | 3/2009 | Schneider et al. |

FOREIGN PATENT DOCUMENTS

| | | | | |
|---|---|---|---|---|
| DE | 3219693 | A | * 12/1983 | .............. B65H 3/32 |
| DE | 3220917 | A1 | * 12/1983 | ............. B65H 3/322 |
| DE | 103 24 182 | B2 | 9/2004 | |
| EP | 0098385 | A1 | 1/1984 | |
| GB | 1191349 | A | 5/1970 | |
| WO | WO-9604194 | A1 | * 2/1996 | ........ B65H 31/3045 |
| WO | WO 2012/069056 | A1 | 5/2012 | |

* cited by examiner

METHOD AND ROBOT CELL FOR HANDLING STACKS OF FLEXIBLE SUBSTRATES

CROSS REFERENCE TO RELATED APPLICATIONS

This application is the National Stage Entry under 35 U.S.C. § 371 of Patent Cooperation Treaty Application No. PCT/SE2015/050320, filed Mar. 19, 2015, which claims priority from Sweden Application No. 1450360-1, filed Mar. 28, 2014, the contents of which are hereby incorporated by reference herein.

TECHNICAL FIELD

The present invention relates to a method of handling stacks of flexible substrates by means of a gripper, the gripper being arranged on an arm of a robot and having a lower finger and a corresponding upper finger, said method comprising the steps of inserting said lower finger below a bottom substrate of a stack resting on a base and said upper finger above a top substrate of the stack, and gripping the stack by clamping it between said lower and upper finger. The present invention also concerns a robot cell for carrying out the method.

In this context, flexible substrates is meant to comprise all sorts of flexible substrates which can be provided in piles, that is for instance paper sheets, whether printed or not, plastic substrates, sheets of metal foil, or even sheets of pastry or pasta.

PRIOR ART

A method according to the preamble is known from the published document WO 2012/069056 A1. According to the known method the gripping action is performed by means of a robot with two grippers, which work in parallel in order to aerate a gripped stack of flexible substrates.

In for instance in the printing industry aerating is an important task, because insufficiently aerated substrates, such as paper sheets, tend to stick together and cause misalignment of individual or a plurality of substrates in a following production stage and hence lead to production disturbances.

OBJECT OF THE INVENTION

The inventor behind the present invention acknowledges the usefulness of a robot in this context but has identified some further stack handling areas where use of a robot leads to major advantages over prior art.

One such area relates to machinery and floor space. In for instance printing factories substrates are often delivered in a large pile and in an oversized format from a printing press. And often before the next major production step, which is cutting into a correct format, besides the aeration step mentioned above a further step does comprise turning upside-down of the whole pile. To this a turning device is required large and powerful enough to handle a standard pallet and several hundreds of kilograms of weight.

Another such area relates to ergonomics. Again, in for instance printing factories before said cutting step a number of oversized substrates have to be gathered into a stack of a size large enough to enable effective cutting in a downstream cutter. In practice said size tends to comprise too many substrates for an operator to handle manually both in terms of size and weight.

And yet another such area is quality. Besides insufficient aeration there are other factors as well that can cause production disturbances due to misalignment. A major one of these is misalignment due to operator negligence, which can lead to an overly incorrect placement of a whole stack of substrates or of individual substrates of a stack on a vibrating table prior to said cutting step. Even a most effective vibrating table cannot altogether compensate for that and the result can be incorrect cut substrates.

Finally, quality can be deteriorated too by accidental scratching or in another way harming a substrate or a print on it, which manual handling is likely to cause from time to time due for instance to size and weight of stacks correctly sized for a cutter.

In the light of the above an object of the invention is to create a method eliminating or at least mitigating the above problems relating to machinery and floor space as well as ergonomics and quality.

BRIEF SUMMARY OF THE INVENTION

According to the invention this object is achieved by means of a method according to the preamble, said method being characterized by the further steps of lifting the entire stack into a pendent state by first lifting a stack front by means of the gripper and, while letting the gripper follow a natural inclination direction of said front, lifting the gripper until it is directed vertically downwards; in the pendent state, moving the stack by means of the gripper to a support; at the support lowering the stack by means of the gripper such that a stack rear, which is opposite to said stack front, comes into contact with the support; and then laying out the entire stack on the support with said bottom substrate up by further lowering the gripper while horizontally displacing it in a bottom-to-top substrate direction before finally letting it release the stack.

The method according to the invention as claimed can lead to a stack wise turning of an entire pile of flexible substrates by means of the robot without need of an extra turning device. This saves machine costs and floor space. Further, the method according to the invention as claimed can relieve an operator of the task of manually moving stacks of flexible substrates from a pile to a support prior to a next production step, such as a vibrating table prior to a cutting step. This is ergonomically most convenient. And finally, quality can be enhanced thanks to the method according to the invention as claimed due to lessened misalignment and scratching problems.

In an improved version the method according to the invention, before lifting the entire stack into a pendent state, comprises the additional step of lifting only said stack front such that said stack rear remains on said base; clamping said stack rear to said base by means of a first bar; releasing grip of said stack front and lowering the gripper while its lower finger remains inserted; gripping the lowered stack front by means of the gripper; and unclamping said stack rear by removing said first bar. The improvement leads to substrates at a front face of said front being arranged in a stepped way, which leads to less offsetting of substrates when laying down the stack on the support.

In a further improved version the method according to the invention as claimed, before laying out the entire stack on the support, comprises the additional step of clamping said stack rear by means of a second bar to the support. This improvement leads to minimizing dislocation of substrates when finally released by the gripper, e.g. due to air caught between substrates.

In a further improved version the method according to the invention as claimed, once said stack rear is in contact with the support, comprises the additional step of imparting a force in said bottom-to-top substrate direction to a mid part of the stack between said stack front and rear, said force making the stack bulge in said direction about a line in parallel with said stack front and rear. This improvement makes an otherwise rather stiff stack reliably bulge in a planned direction and hence the substrates contained therein behave as wanted.

Preferably, if the support is an inclined vibrating table provided with an upright back plate protruding from the table, the method according to the invention as claimed, when lowering the stack into contact with the support, comprises the additional step of making the stack rear contacting the table in an interface area between the table and said back plate. Especially in combination with the above step involving said first bar, this solution leads to a very precise placement of the stack in relation to the support and hence to a further enhanced reliability.

Preferably, the method according to the invention as claimed comprises the additional steps of letting said robot handle said stacks from behind a substrate supply and said support and of letting an operator, if necessary, handle substrates from an operator space provided in front of said substrate supply and said support. By this interaction between the robot and an operator is greatly improved, since both more or less have their own working space.

Preferably, the method according to the invention as claimed comprises handling of said stacks by means of a pair of grippers, each gripper being arranged on one arm each of a two-arm robot and each having a lower finger and a corresponding upper finger, the method further comprising the additional step of initially inserting a first lower finger of a first one of said pair of grippers, inserting a second lower finger of a second one of said pair of grippers into a gap created by the inserted first lower finger, and then moving at least one of said lower fingers in an inserted state along a front of the stack away from the other lower finger before said stack is gripped by being clamped between said lower fingers and corresponding upper fingers of said pair of grippers. A method involving a two-arm robot is more substrate lenient than a method involving a robot using just one arm and thus necessarily a single larger gripper, and it is more versatile, too, e.g. because it enables an aeration step according to the cited prior art document.

When using a two-arm robot, the method according to the invention as claimed preferably, after initial gripping of the stack, comprises the additional step of moving said pair of grippers in parallel until final release onto said support. In this way misalignment and other such issues are reliably avoided.

According to another aspect the invention concerns a robot cell for carrying out the claimed method, said robot cell comprising a robot arranged behind a substrate supply and a substrate support and an operator space arranged in front of said substrate supply and said substrate support. Again, this is advantageous as it creates a more or less unhampered working space for both the robot and an operator, which is good for safety reasons and improves the interaction possibilities between the two.

Preferably, in the robot cell said substrate supply comprises a lifting table arranged to lift a pile of substrates step by step as stacks of flexible substrates are removed there from by the robot. An advantage of that is that it enables reduction of cycle times, since the robot in that way does not need to pick up stacks on increasingly lower levels of height.

Finally, if said substrate support of the robot cell comprises an inclined vibrating table, said table is preferably rotatably mounted on a socle, such that it can be directed towards or away from the robot. In that way work of both the robot and, if necessary, manual work of an operator can be facilitated and speeded up.

BRIEF DESCRIPTION OF THE DRAWINGS

In the drawings a preferred embodiment of the invention is shown schematically, wherein.

DETAILED DESCRIPTION OF A PREFERRED EMBODIMENT

Figure 1:
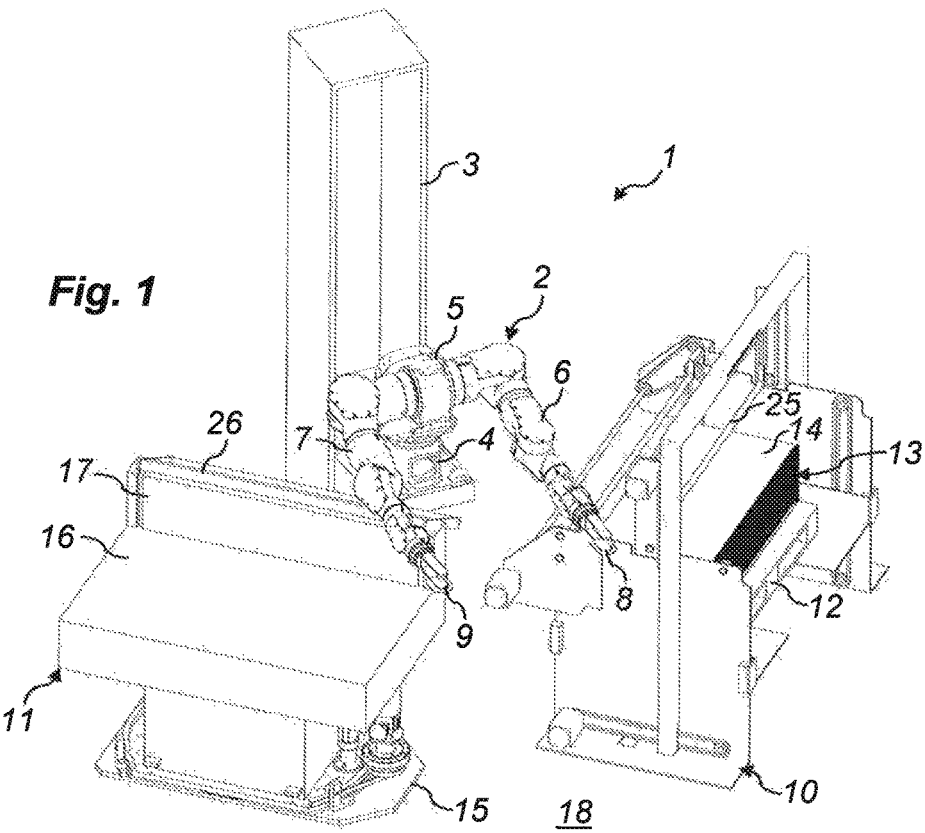
FIG. 1 is a perspective view showing a general layout of a robot cell according to the invention.

The robot cell 1 shown in FIG. 1 comprises in the background a two-arm robot 2, which is supported by a column 3 in a way that makes height adjustment possible for added flexibility. The robot 2 as such can rotate about a vertical axis on a base 4 and comprises a shoulder part 5, which bears two arms 6, 7. These are in a generally known fashion pivoted in multiple ways and bear grippers 8, 9 at their distal ends.

In front of the robot 2 the robot cell as shown comprises two units, the right one being a lifting table 10 and the left one being a vibrating table 11.

The lifting table 10 is arranged to store a pallet 12 or the like, on which a pile 13 of flexible substrates 14 is resting in a height adjustable way. The substrates 14 are for instance paper sheets, which come from a printing machine (not shown) and have a print on at least one of their both sides, such as the side shown facing upwards in FIG. 1.

The vibrating table 11 comprises a socle 15 and a table top 16 forming a support. The table top 16 inclined towards the robot 2 and comprises an upright back plate 17, the function of which will be described later on. The table top 16 is rotatably mounted on the socle 15 about a vertical axis. Thus, it can be rotated such that said back plate 17, as shown, is next to the robot 2 or distant from the robot 2, in which case the table top 16 is inclined away from the robot 2.

In front of the lifting table 10 and the vibrating table 11 there is a space generally denoted 18, which is not occupied by any robot parts. According to the invention this space 18 is to be used by an operator (not shown) having the task to monitor the robot cell 1 and for instance to load a new pallet 12 with a new pile 13 of flexible substrates 14 onto the lifting table 10 when necessary, which conveniently can be done from the front.

Further details of the robot cell 1 will be described below in connection with a detailed description of a preferred embodiment of a method according to the invention with reference being had to FIGS. 2-10.

Figure 2:
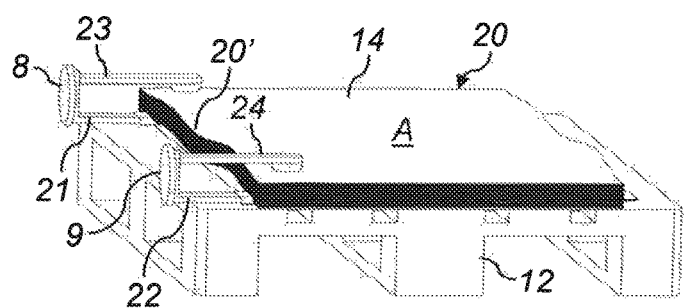
FIGS. 2-10 in sequence illustrate steps of a method according to the invention.
Figure 3:
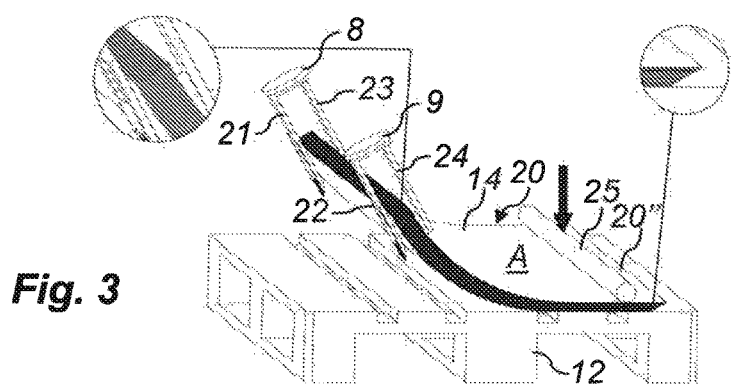
Figure 4:
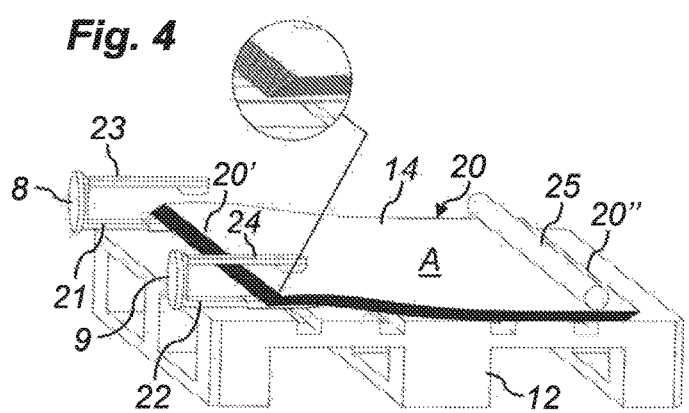
Figure 9:
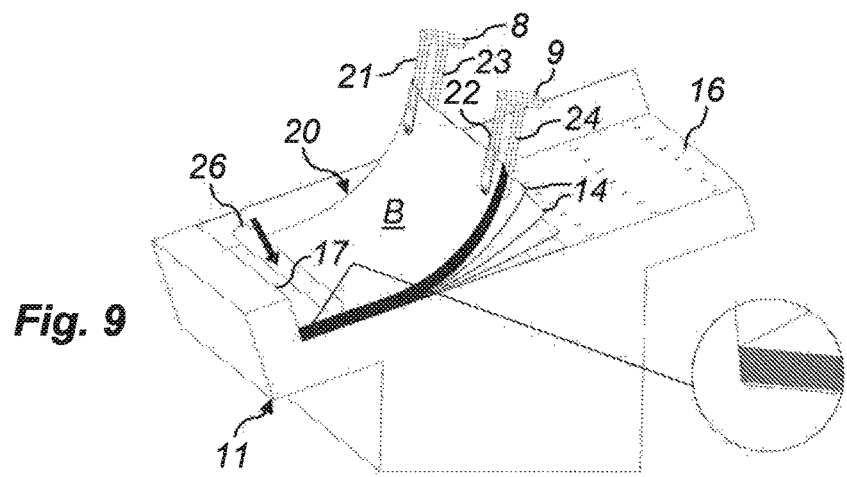
Figure 10:
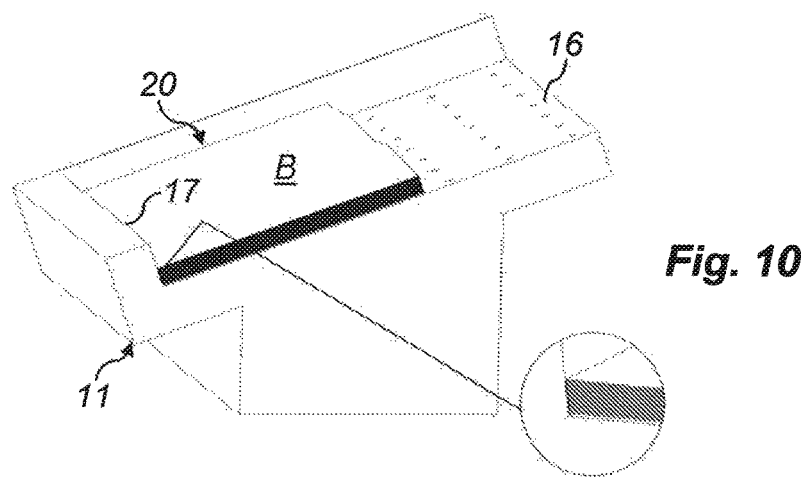

Generally the preferred method according to the invention concerns handling of flexible substrates 14. These are usually, as shown in FIG. 1, provided in a pile 13 on a pallet 12. The substrates 14, such as sheets which come from a printing machine (not shown), are to be divided into batches or stacks 20 of a thickness suitable for cutting in a cutter (not shown). Further, the substrates 14 are to be turned upside-down as well, such that their sides A, facing upwards in FIGS. 2-4, are turned downwards and their sides B are turned upwards instead, such as shown in FIGS. 9 and 10. And finally, the substrates 14 arranged in stacks 20 before cutting have to be well aligned, such that cutting is performed in the right places.

All this is achieved with the method according to the invention by means of the robot cell 1, comprising inter alia the robot 2 and its pair of grippers 8, 9. Each of these is arranged on one arm 6, 7 each of the two-arm robot 2 and each has a lower finger 21, 22 and a corresponding upper finger 23, 24.

In a first method step a first lower 21 finger of a first one 8 of said pair of grippers 8,9 is inserted substantially horizontally below a bottom substrate 14 of a stack 20, which can rest directly on a base or pallet 12 or form a top part of a larger pile 13 of flexible substrates 14 and hence rest on a base of other substrates 14. Then a second lower finger 22 of a second one 9 of said pair of grippers 8, 9 is inserted substantially horizontally into a gap created by the inserted first lower finger 21. Thereafter at least one of said lower fingers 21, 22 in an inserted state is moved along a front 20' of the stack 20 away from the other lower finger 21, 22 before said stack 20 is gripped by being clamped between said lower fingers 21, 22 and corresponding upper fingers 23, 24 of said pair of grippers 8, 9, said upper fingers 23, 24 being in contact with an upwards facing side A of a top substrate 14. By now the description has arrived at the situation schematically illustrated in FIG. 2.

The next method step, which is illustrated in FIGS. 2 and 3, comprises lifting of said stack front 20' only (c.f. FIG. 3) by means of the grippers 8, 9 working in parallel, such that a stack rear 20" remains on its base, such as the pallet 12 shown or pile mentioned. Then said stack rear 20" is clamped to said base by means of a first bar 25. The first bar 25 can be formed like the one shown in FIG. 1, which is activated (lowered and lifted) by means of e.g. a tooth belt drive. Now the grippers 8, 9 release the stack front 20' and move downwards while letting their lower fingers 21, 22 remaining in an inserted state. Back in their initial position, shown in FIG. 4, the grippers 8, 9 grip the stack 20 anew, and then the first bar 25 unclamps said stack rear 20" by being lifted. The result of the entire action is illustrated in the embedded enlarged views in FIGS. 3 and 4, clearly showing that substrates 14 at said stack rear 20" and at said stack front 20' become arranged in a stepped way, which is advantageous in method steps to follow.

Figure 5:
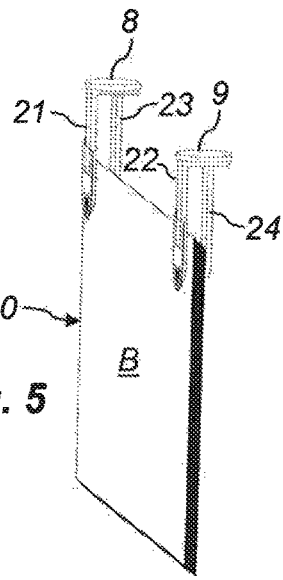

The next method step comprises lifting of the entire stack 20 gripped by the grippers 8, 9 into a pendent state. This is illustrated in FIG. 5, which also clearly illustrates that the grippers 8, 9 while having gripped a stack 20 always are adjusted such that they are in line with a natural inclination direction of the stack 20 and its flexible substrates 14 (c.f. gripper and stack inclination in FIGS. 2-9).

Figure 6:
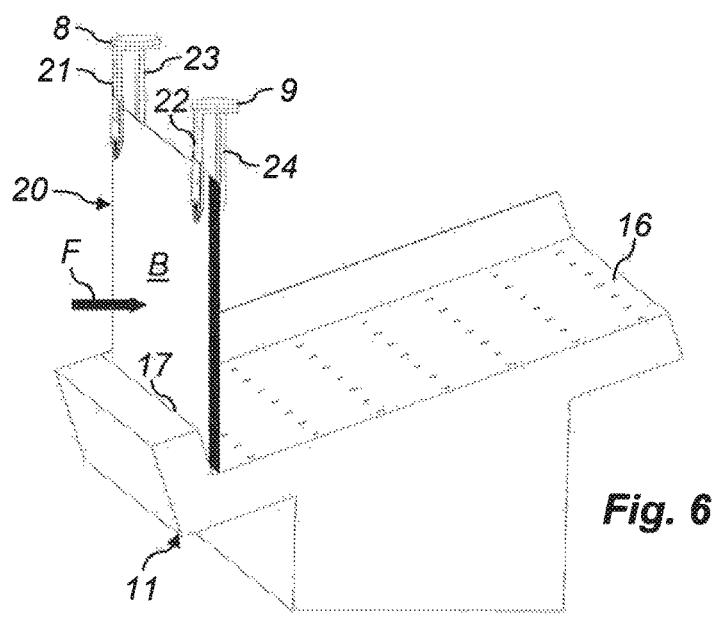
Figure 7:
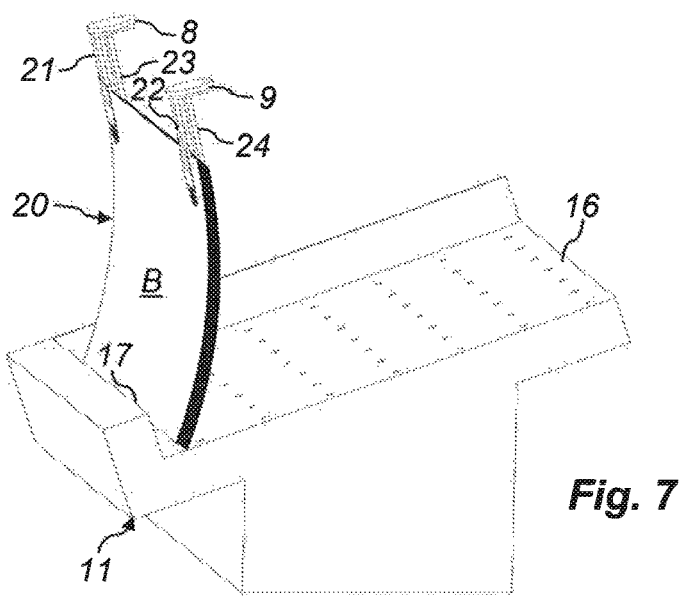

In the pendent state the stack 20 is transferred by the robot 2, which can turn on its base 4 (c.f. FIG. 1), to a support in the form of an inclined table top 16 of a vibrating table 11. There, as illustrated in FIG. 6, a side B of a previous bottom substrate 14 of the stack 20 is aligned with and put against the back plate 17 while the stack 20 is lowered until it contacts the table top 16 as such. Now a force indicated by an arrow F is imparted, e.g. by means of an air blast or in a suitable mechanical way, centrally onto said side B in a bottom-to-top substrate direction, which makes the stack 20 bulge about a line in parallel with said stack front 20' and rear 20". This is clearly illustrated in FIG. 7, where also can be seen that the stack 20 is continued to be lowered by means of the grippers 8, 9, while these in parallel move away from said back plate 17.

The lowering continuous until a stack position is achieved similar to the one of FIG. 3. There are, however, two important differences. The first one is that now the stack 20 has a former bottom side B turned up and a former top side A turned down. In other words, handling of the stack 20 by means of the method according to the invention leads to turning thereof upside down without need of an extra turning device or human interaction by an operator. The second difference is that use of the previously described first bar 25 makes the substrates 14 of the stack 20 abut said back plate 17 in a substantially straight or non-offset fashion (c.f. the enlargement view of FIG. 8) and not in a stepped way, which otherwise would be the case.

Figure 8:
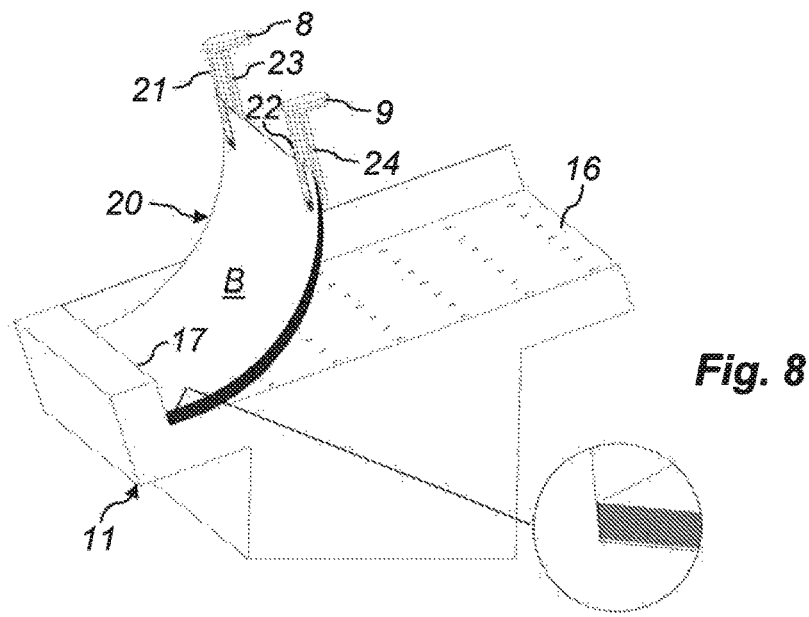

When the grippers 8, 9 have been lowered as far as shown in FIG. 8, a second bar 26 comes into play (c.f. FIGS. 1 and 9). It is used to clamp the stack rear 20" onto the table top 16, before the grippers 8, 9 finally release the stack 20. Thanks to the clamping a tendency of substrates 14 to dislocate, e.g. because of air caught between the substrates 14 is thus eliminated.

In the final FIG. 10 the stack 20 is shown lying upside down on the table top 16. Again an embedded enlargement view is used to illustrate that the substrates 14 of the stack 20 are already aligned quite well even before use is made of the vibrating table 11 to arrive at a final stack 20 having all its substrates 14 abut the back plate 17 and being ready for cutting by means of a cutter (not shown).

A person skilled in the art is aware that the method as well as the robot cell 1 described can be altered in different ways within the scope of the appendent claims. Thus, it is not absolutely necessary to use a two-arm robot 2 with a pair of grippers 8, 9, but it is preferred to do so due to e.g. flexibility. Further, use for instance of the first and second bars 25, 26 is not mandatory, but advantageous in view of substrate alignment quality. And finally and although not shown, in order to maximize stack quality on the table top 16 of the vibrating table 11, there may be a plurality of gas evacuating nozzles in said back plate 17 and/or a gas evacuating trench in an interface area between the table top 16 and the back plate 17, which are arranged to evacuate gas emanating from a plurality of gas ejecting nozzles in said back plate 17. The gas is used to make parts of substrates 14 of a stack 20 floating, while the stack 20 is being vibrated, and hence these substrates 14 less prone to stick together. The gas used is preferably ionized air, which helps mitigating problems with static electricity.

The invention claimed is:

1. A method of handling a stack of flexible substrates using a gripper arranged on an arm of a robot, the gripper having a lower finger and a corresponding upper finger, said method comprising:
   inserting said lower finger below a bottom substrate of the stack and said upper finger above a top substrate of the stack, wherein the bottom substrate is resting on a base;
   gripping the stack by clamping a stack front between said lower finger and said upper finger;
   lifting the stack front using the gripper such that the stack is lifted into a pendent state;
   while letting the gripper follow a natural inclination direction of said stack front, lifting the gripper such that the stack is directed vertically downwards,
   in the pendent state, moving the stack to a support using the gripper;

at the support, lowering the stack using the gripper such that a stack rear, which is opposite to said stack front, comes into contact with the support; and laying out the stack upside down on the support with the top substrate down and the bottom substrate up and the top substrate resting on the support by lowering the gripper while horizontally displacing the gripper in a bottom-to-top substrate direction before releasing the stack.

2. The method according to claim 1, wherein before lifting the stack into a pendent state, the method further comprising:

lifting only said stack front such that said stack rear remains on said base;

clamping said stack rear to said base using a first bar;

releasing grip of said stack front and lowering the gripper while the lower finger remains inserted;

gripping the lowered stack front using the gripper; and unclamping said stack rear by removing said first bar.

3. The method according to claim 2, wherein before laying out the stack on the support, the method further comprising clamping said stack rear to the support using a second bar.

4. The method according to claim 3, wherein when said stack rear is in contact with the support, the method further comprising imparting a force (F) in said bottom-to-top substrate direction to a mid-part of the stack between said stack front and said stack rear, said force (F) making the stack bulge in said bottom-to-top substrate direction about a line in parallel with said stack front and said stack rear.

5. The method according to claim 1, wherein the support forms part of an inclined vibrating table having an upright back plate protruding from a table top, said method further comprising when lowering the stack into contact with the table top, making the stack rear contact the table at an interface defined by the table top and said back plate.

6. The method according to claim 1, further comprising said robot handling said stack from a first side of a substrate supply and said support being configured to enable an operator to handle substrates from an operator space on a second side of said substrate supply and said support.

7. The method according to claim 6, wherein said robot handling of said stack is carried out using a pair of grippers, wherein each gripper is arranged on one arm each of a two-arm robot and each gripper having a lower finger and a corresponding upper finger, the method further comprising:

inserting, between the bottom substrate and the base, a first lower finger of a first gripper of said pair of grippers such that a gap is created between the bottom substrate and the base;

inserting a second lower finger of a second gripper of said pair of grippers into the gap created by the inserted first lower finger; and moving at least one of said inserted lower fingers along a front of the stack away from the other inserted lower finger before said stack is gripped by being clamped between the inserted first lower finger and a corresponding first upper finger and between the inserted second lower finger and a corresponding second upper finger of said pair of grippers.

8. The method according to claim 7, after gripping of the stack, the method further comprising moving said pair of grippers in parallel until final release of the stack onto said support.

9. A robot cell comprising:

a robot arranged on a first side of a substrate supply and a substrate support, wherein an operator space is arranged on a second side of said substrate supply and said substrate support; and a gripper arranged on an arm of a robot, the gripper having a lower finger and a corresponding upper finger, wherein the robot cell is configured to:

insert said lower finger below a bottom substrate of the stack resting on a base and said upper finger above a top substrate of the stack;

grip the stack by clamping it between said lower finger and said upper finger;

lift the stack into a pendent state by lifting a stack front using the gripper;

while letting the gripper follow a natural inclination direction of said stack front, lift the gripper such that the gripper is directed vertically downwards, in the pendent state, move the stack to a support using the gripper;

at the support, lower the stack using the gripper such that a stack rear, which is opposite to said stack front, comes into contact with the support; and lay out the stack upside down on the support with the top substrate down and the bottom substrate up by lowering the gripper while horizontally displacing the gripper in a bottom-to-top substrate direction before releasing the stack.

10. The robot cell according to claim 9, wherein said substrate supply comprises a lifting table arranged to lift a pile of flexible substrates step by step as stacks of flexible substrates are removed there from by the robot.

11. The robot cell according to claim 9, wherein said substrate support forms part of an inclined vibrating table that is rotatably mounted on a socle such that the inclined vibrating table can be directed towards or away from the robot.

* * * * *